(12) United States Patent
Ferguson et al.

(10) Patent No.: US 10,751,711 B2
(45) Date of Patent: Aug. 25, 2020

(54) FISCHER-TROPSCH CATALYST PERFORMANCE ENHANCEMENT PROCESS

(71) Applicant: BP P.L.C., London (GB)

(72) Inventors: Ewen James Ferguson, Beverley (GB); Manuel Ojeda Pineda, Hull (GB); Alexander James Paterson, Hull (GB)

(73) Assignee: BP p.l.c., London (GB)

( * ) Notice: Subject to any disclaimer, the term of this patent is extended or adjusted under 35 U.S.C. 154(b) by 0 days.

(21) Appl. No.: 16/327,824

(22) PCT Filed: Aug. 18, 2017

(86) PCT No.: PCT/EP2017/070917
§ 371 (c)(1),
(2) Date: Feb. 23, 2019

(87) PCT Pub. No.: WO2018/036919
PCT Pub. Date: Mar. 1, 2018

(65) Prior Publication Data
US 2019/0193068 A1 Jun. 27, 2019

(30) Foreign Application Priority Data
Aug. 23, 2016 (GB) .................. 1614363.8

(51) Int. Cl.
| | | |
|---|---|---|
| *B01J 38/10* | (2006.01) | |
| *B01J 23/889* | (2006.01) | |
| *B01J 23/94* | (2006.01) | |
| *B01J 21/06* | (2006.01) | |
| *B01J 23/75* | (2006.01) | |
| *C10G 2/00* | (2006.01) | |
| *B01J 23/80* | (2006.01) | |

(52) U.S. Cl.
CPC ............ *B01J 38/10* (2013.01); *B01J 21/063* (2013.01); *B01J 23/75* (2013.01); *B01J 23/80* (2013.01); *B01J 23/8892* (2013.01); *B01J 23/94* (2013.01); *C10G 2/332* (2013.01); *C10G 2/341* (2013.01); *C10G 2300/705* (2013.01)

(58) Field of Classification Search
CPC .. C10G 2/332; C10G 2300/705; C10G 2/341; B01J 23/8892; B01J 23/94; B01J 21/063; B01J 23/75; B01J 38/10; B01J 23/80
See application file for complete search history.

(56) References Cited

U.S. PATENT DOCUMENTS

| | | |
|---|---|---|
| 5,958,985 A | 9/1999 | Geerlings |
| 6,486,220 B1 | 11/2002 | Wright |
| 2004/0059008 A1 | 3/2004 | Raje |
| 2004/0152791 A1 | 8/2004 | Zyl et al. |
| 2004/0192989 A1 | 9/2004 | Espinoza |
| 2005/0124706 A1 | 6/2005 | Wright |
| 2008/0210596 A1* | 9/2008 | Litt .............. B01J 19/0093 208/20 |
| 2009/0298681 A1 | 12/2009 | Nikrad et al. |
| 2010/0304955 A1 | 12/2010 | Van De Loosdrecht |
| 2011/0275512 A1* | 11/2011 | Huyser ............ B01J 23/745 502/258 |
| 2013/0210939 A1 | 8/2013 | Rytter |

FOREIGN PATENT DOCUMENTS

| | | |
|---|---|---|
| EP | 1920836 A1 | 5/2008 |
| WO | 2010/070475 A1 | 6/2010 |
| WO | 2016091692 A2 | 6/2016 |

OTHER PUBLICATIONS

International Search Report for International Application No. PCT/EP2017/070917, dated Nov. 15, 2017.
Written Opinion of the International Searching Authority for International Application No. PCT/EP2017/070917, dated Nov. 15, 2017.

\* cited by examiner

*Primary Examiner* — Jafar F Parsa
(74) *Attorney, Agent, or Firm* — McDonnell Boehnen Hulbert & Berghoff LLP

(57) ABSTRACT

The present invention relates to a process for treating a catalyst to improve performance, and more specifically to a process for treating a Fischer-Tropsch catalyst using a high hydrogen syngas to improve catalyst performance.

21 Claims, No Drawings

FISCHER-TROPSCH CATALYST PERFORMANCE ENHANCEMENT PROCESS

This application is a national stage application under 35 U.S.C. § 371 of International Application No. PCT/EP2017/070917, filed Aug. 18, 2017, which claims priority to Great Britain Patent Application No. GB 1614363.8, filed Aug. 23, 2016, the disclosures of which are explicitly incorporated by reference herein.

The present invention relates to a process for treating a catalyst to improve performance, and more specifically to a process for treating a Fischer-Tropsch catalyst using a hydrogen or a high hydrogen syngas to improve catalyst performance.

The conversion of synthesis gas into hydrocarbons by the Fischer-Tropsch process has been known for many years. The Fischer-Tropsch process was discovered in the early 1920's by two German scientists, Franz Fischer and Hans Tropsch, at the Kaiser Wilhelm Institute in Germany. The Fischer-Tropsch process converts a mixture of hydrogen and carbon monoxide derived from coal, methane, or biomass, to liquid fuels. The growing importance of alternative energy sources has seen renewed interest in the Fischer-Tropsch process as one of the more attractive direct and environmentally acceptable routes to high quality transportation fuels.

The loss of catalytic activity or selectivity over time remains problematic and continues to raise concern in industrial catalytic processes. The cost to industry for catalyst replacement and process shutdown is in the billions of dollars annually. Therefore, there is a constantly felt need to improve the performance of catalysts used in industrial catalytic processes.

The present invention relates to a process for treating a Fischer-Tropsch catalyst to improve performance, and more specifically to a process for treating a Fischer-Tropsch catalyst using a high hydrogen level treatment, for example with a high hydrogen syngas, to improve catalyst performance. More specifically, the invention relates to a process for treating a Fischer-Tropsch catalyst without having to withdraw it from a Fischer-Tropsch synthesis reactor. Exemplary Fischer-Tropsch catalysts which may be treated according to the process disclosed herein include, but not limited to, cobalt-based Fischer Tropsch catalysts, such as $CoZnO$, $CoTiO_2$, and $CoMnTiO_2$ catalysts.

The present invention provides a process for improving performance of a Fischer-Tropsch catalyst comprising the steps of:

(a) contacting the catalyst with hydrogen or syngas at a temperature in the range of from about 200° C. to about 450° C., under a pressure in the range of from about 0 barg to about 50 barg, and a GHSV in the range of from about 500 $hr^{-1}$ to about 5000 $hr^{-1}$, for a period of time of at least 1 hour, preferably in the range of from about 1 hour to about 24 hours, to provide a reduced catalyst;

(b) contacting the reduced catalyst of step (a) with syngas comprising $H_2$:CO in a ratio in the range of from about 1:1 to about 2.1:1, in a Fischer-Tropsch synthesis reactor under a pressure in the range of from about 0 barg to about 50 barg, preferably in the range of from about 10 barg to about 42 barg, and a GHSV of over 1000 $hr^{-1}$, at a temperature in the range of from about 100° C. to about 280° C.;

(c) increasing the ratio of $H_2$:CO of the syngas to a ratio of at least 3:1, preferably in the range of from about 3:1 to about 10:1, at a pressure in the range of from about 30 barg to about 42 barg, for a period of time of at least 1 hour, preferably in the range of from about 1 hour to about 24 hours, at a temperature in the range of from about 160° C. to about 250° C., and a GHSV in the range of from about 1000 $hr^{-1}$ to about 8000 $hr^{-1}$; and (d) decreasing the ratio of $H_2$:CO of the syngas to a ratio in the range of from about 1:1 to about 2.1:1, at a GHSV in the range of from about 1250 $hr^{-1}$, under a pressure in the range of from about 30 barg to about 42 barg, and at a temperature in the range of from about 160° C. to about 280° C.

In another embodiment there is provided a process for improving performance of a Fischer-Tropsch catalyst comprising the steps of:

(a) contacting the catalyst with hydrogen or syngas at a temperature in the range of from about 200° C. to about 450° C., under a pressure in the range of from about 0 barg to about 50 barg, and a GHSV in the range of from about 500 $hr^{-1}$ to about 5000 $hr^{-1}$, for a period of time of at least 1 hour, preferably in the range of from about 1 hour to about 24 hours, to provide a reduced catalyst;

(b) contacting the reduced catalyst of step (a) with syngas comprising $H_2$:CO in a ratio in the range of from about 1:1 to about 2.1:1, in a Fischer-Tropsch synthesis reactor under a pressure in the range of from about 0 barg to about 50 barg, preferably in the range of from about 10 barg to about 42 barg, and a GHSV of over 1000 $hr^{-1}$, at a temperature in the range of from about 100° C. to about 280° C.;

(c) replacing the syngas with either pure hydrogen or a hydrogen/nitrogen mixture, at a pressure in the range of from about 30 barg to about 42 barg for a period of time of at least 1 hour, preferably in the range of from about 1 hour to about 24 hours, at a temperature in the range of from about 160° C. to about 250° C. and a GHSV in the range of from about 1000 $hr^{-1}$ to about 8000 $hr^{-1}$; and (d) decreasing the hydrogen level and restoring a ratio of $H_2$:CO of the syngas to a ratio in the range of from about 1:1 to about 2.1:1, at a GHSV in the range of from about 1250 $hr^{-1}$, under a pressure in the range of from about 30 barg to about 42 barg, and at a temperature in the range of from about 160° C. to about 280° C.

In another embodiment there is provided a process for improving performance of a Fischer-Tropsch catalyst comprising the steps of:

(a) contacting the catalyst with $H_2$ or syngas at a temperature in the range of from about 200° C. to about 450° C., under a pressure in the range of from about 0 barg to about 50 barg, and a GHSV in the range of from about 500 $hr^{-1}$ to about 5000 $hr^{-1}$, for a period of time of at least 1 hour, preferably in the range of from about 1 hour to about 24 hours, to provide a reduced catalyst;

(b) contacting the reduced catalyst of step (a) with syngas comprising $H_2$:CO in a ratio of from about 1:1 to about 2:1, under a pressure in the range of from about 0 barg to about 50 barg, preferably in the range in the range of from about 10 barg to about 42 barg, and a GHSV of over 1000 $hr^{-1}$, at a temperature in the range of from about 100° C. to about 280° C., more preferably from about 100° C. to about 240° C., and most preferably from about 100° C. to about 230° C.;

(c) eliminating the CO from the syngas of step (b) for a period of time of at least 1 hour, preferably in the range of from about 1 hour to about 24 hours; and (d) reintroducing the CO to provide syngas with a ratio of $H_2$:CO in the range of from about 1:1 to about 2.1:1, at a GHSV of about 1250 $hr^{-1}$, under a pressure in the range of from about 30 barg to about 42 barg, and at a temperature in the range of from about 160° C. to about 280° C., more preferably from about 160° C. to about 240° C., and most preferably from about 160° C. to about 230° C.

The present invention provides a novel process whereby improved Fischer-Tropsch catalyst performance may be achieved by a high hydrogen level treatment during a reactor run. In particular, this may include treatment using a pure hydrogen feed or a hydrogen feed diluted with an inert gas, such as nitrogen, treatment using a high syngas $H_2$:CO ratio feed of at least 3:1, typically greater than 3:1, and more typically in the range of from about 3:1 to about 10:1, such as between 6:1 and 10:1; alternatively, the high hydrogen level treatment during a reactor run can be achieved by eliminating the carbon monoxide from the syngas feed. The effect of a high hydrogen level treatment of the catalyst in the reactor, for example with syngas with a high $H_2$:CO ratio, is to improve the catalyst giving sustained long term performance rather than a short term improvement in performance. This high hydrogen syngas ratio or hydrogen treatment of the present invention can be applied shortly after the start-up of the Fischer Tropsch reaction, e.g. in the range of 1 hour to 1000 hours, more preferably 100 hours to 500 hours, and most preferably 100 hours to 300 hours during the reactor run, without the need for a full plant shutdown.

Surprisingly, it has been discovered that using a high hydrogen level treatment, such as a treatment using a high hydrogen syngas ratio or pure hydrogen optionally diluted with an inert gas, improves catalyst performance, and has been demonstrated to potentially give a better performance than the initial fresh catalyst starting performance, suggesting an improvement in the catalyst activity rather than a 'cleaning' of the catalyst, which is commonly observed with regeneration processes.

Any catalyst suitable for use in Fischer Tropsch synthesis may be treated by a process according to the present invention. In some or all embodiments, the catalyst comprises a porous support material and at least one metal selected from cobalt, iron, nickel, ruthenium or rhodium. Within the Fischer-Tropsch process, cobalt catalysts may be used to produce hydrocarbons from syngas, with a preference away from forming methane, although after time on stream, methane selectivity can rise as the catalyst ages. Thus, in some or all embodiments, the Fischer-Tropsch catalyst can be selected from cobalt-based Fischer Tropsch catalysts. In some or all embodiments, the Fischer Tropsch catalyst can be selected from CoZnO, $CoTiO_2$, or $CoMn-TiO_2$.

The Fischer-Tropsch reactor can be a fixed bed, tubular reactor, slurry reactor such as a tank reactor or a tubular loop reactor.

Prior to performing the Fischer Tropsch synthesis reaction, the Fischer Tropsch catalyst is required to be converted to its active form by performing a reduction step. The reduction step comprises treating the Fischer Tropsch catalyst with a hydrogen containing gas, such as a syngas or hydrogen, typically hydrogen optionally diluted with inert gas, in order to reduce the catalytically active metal on the catalyst, such as cobalt on a cobalt-based Fischer Tropsch catalyst, into the active metallic cobalt form.

In some or all embodiments, the catalyst of step (a) is reduced within the Fischer-Tropsch synthesis reactor.

In some or all embodiments, following step (a) the catalyst is passivated prior to step (b).

In some or all embodiments, following step (a) the catalyst can be passivated prior to step (b), the passivated catalyst can then be loaded into the Fischer-Tropsch synthesis reactor prior to step (b).

A typical process for converting synthesis gas to hydrocarbons in a slurry reactor or fixed bed reactor in the presence of a Fischer-Tropsch catalyst comprises loading the catalyst into a reactor, activating a Fischer-Tropsch catalyst with a reducing gas consisting of hydrogen and an inert gas at a temperature between about 200° C. to about 450° C. for a period of time for a period of time of at least 1 hour, preferably in the range of from about 1 hour to about 24 hours, and contacting the activated Fischer-Tropsch catalyst with synthesis gas in the fixed bed, tubular reactor, or a slurry reactor (e.g., tank reactor or a tubular loop reactor) in order to produce hydrocarbons from the synthesis gas.

Preferably the Fischer-Tropsch synthesis reaction is operated with a gas hourly space velocity (GHSV) in the range of about 100 $h^{-1}$ to about 40000 $h^{-1}$, more preferably about 1000 $h^{-1}$ to about 30000 $h^{-1}$, most preferably about 1250 $h^{-1}$ to about 10000 $h^{-1}$ at normal temperature and pressure (NTP) based on the feed volume of synthesis gas at NTP.

The Fischer-Tropsch process is carried out at a temperature in the range of from about 100° C. to about 280° C., such as from about 100° C. to about 240° C. or from about 100° C. to about 230° C., preferably the Fischer Tropsch process is carried out at a temperature of about 160° C. to about 280° C., more preferably about 160° C. to about 240° C., and most preferably about 160° C. to about 230° C.

The Fischer-Tropsch process is carried out at a pressure in the range of from about 0 barg to about 50 barg, typically from about 10 barg to about 45 barg, such as from about 15 bar to about 45 bar, preferably in the range of from about 10 barg to about 42 barg, such as from about 30 bar to about 42 bar.

The synthesis gas may be prepared using any of the processes known in the art. Non-limiting examples of suitable processes which may be used include partial oxidation of hydrocarbons, steam reforming, gas heated reforming, microchannel reforming, plasma reforming, autothermal reforming, catalytic partial oxidation, for example catalytic partial oxidation of hydrocarbons in a microstructured reactor (as exemplified in "IMRET 3: Proceedings of the Third International Conference on Microreaction Technology", Editor W Ehrfeld, Springer Verlag, 1999, pages 187-196) or short contact time catalytic partial oxidation of hydrocarbonaceous feedstocks (as described in EP 0303438), via a "Compact Reformer" process (as described in "Hydrocarbon Engineering", 2000, 5, (5), 67-69; "Hydrocarbon Processing", 79/9, 34 (September 2000); "Today's Refinery", 15/8, 9 (August 2000); WO 99/02254; and WO 200023689), and any combination thereof.

The reduced catalyst is contacted with the syngas in the Fischer Tropsch reactor under the reaction conditions for a sufficient period to obtain steady state conditions, typically in the order of a few hundred hours under commercially realistic FT conditions as described previously, and the temperature is adjusted to provide a particular level of carbon monoxide conversion, typically this may be between about 50 and 65%.

Preferably, the hydrocarbons produced by contact of the synthesis gas with the Fischer-Tropsch catalyst comprise a mixture of hydrocarbons, the majority of which having a chain length of greater than 5 carbon atoms. Suitably, the hydrocarbons comprise a mixture of hydrocarbons, the majority of which having chain lengths of from 5 to about 100 carbon atoms. Preferably, a major amount, for example, greater than 60% by weight, of the hydrocarbons have chain lengths of from 5 to 30 carbon atoms.

Surprisingly it has been discovered that methane selectivity is reduced by exposing the catalyst to a high hydrogen content gas stream, for example a high hydrogen content syngas, i.e. an $H_2$:CO ratio of at least 3, such as from 6 to 10, and up to pure hydrogen, in situ after a period of time running the reaction (i.e. exposed to the Fischer Tropsch feed syngas under reaction conditions). Conditions for the high hydrogen level treatment are typically a pressure of about 30 barg to 42 barg, for a period of time of at least one hour, for example in the range of about 1 hour to about 48 hours, preferably about 1 hour to about 24 hours, and more preferably from about 12 hours to about 24 hours, at a temperature of about 160° C. to about 250° C., such as about 180° C. to about 220° C.

Surprisingly it has been discovered that methane selectivity is reduced even below the starting level, indicating an intrinsic improvement to the catalyst itself, rather than simply regenerating/cleaning it (the benefit is not merely a "spike"). The performance benefits have been demonstrated for thousands of hours, and it has been noted that repeating the treatment at later time on stream has little impact, suggesting the catalyst is fundamentally changed/improved rather than a cleaning of the deactivated catalyst.

Further benefits include that the catalyst may be treated in situ, no need to shut down entirely.

This high hydrogen level treatment can be used to improve a catalyst to improve its performance and/or catalyst life, or it may be used to improve the performance of an underperforming catalyst.

The high hydrogen treatment gives the catalyst extra stability for the subsequent hours on stream. Where a catalyst was deactivating prior to the treatment it shows greater stability after the treatment, such that conversion is seen to be more stable and the applied temperature is not increased as rapidly to maintain conversion levels. Catalysts which exhibit deactivation prior to the treatment have been observed to be more resistant to deactivation afterwards.

In some or all embodiments, the Fischer Tropsch synthesis catalyst comprises a porous titania-based material, and further comprises at least one metal selected from cobalt, iron, nickel, ruthenium or rhodium, preferably cobalt.

the Fischer-Tropsch synthesis catalyst comprises a porous, extruded titania-based material, and further comprises at least one metal selected from cobalt, iron, nickel, ruthenium or rhodium, preferably cobalt. The amount of metal, on an elemental basis, present in the Fischer-Tropsch synthesis catalyst is suitably from 5.0 wt % to 30.0 wt %, preferably 7.0 wt % to 25.0 wt %, more preferably 10 wt % to 20 wt %, based on the total weight of the catalyst.

In some or all embodiments where the Fischer Tropsch synthesis catalyst comprises a porous, extruded titania-based material, the porous, extruded titania-based material comprises mesopores and macropores, suitably the porous, extruded titania-based material may comprise mesopores having a pore diameter of 2 to 50 nm, for example 5 to 50 nm, preferably 15 to 45 nm or 20 to 45 nm, more preferably 25 to 40 nm or 30 to 40 nm.

In some or all embodiments, the porous, extruded titania-based material has a total pore volume of at least 0.10 ml/g, preferably at least 0.20 ml/g, more preferably at least 0.30 ml/g. The upper limit of the total pore volume is not critical, so long as the material remains sufficiently robust to function as a catalyst support. Particularly preferred ranges of total pore volume for a porous, extruded titania-based material comprising mesopores and macropores according to the present invention are 0.10 to 1.00 ml/g, such as 0.20 to 1.00 ml/g, 0.20 to 0.90 ml/g or 0.20 to 0.70 ml/g.

In some or all embodiments, the porous, extruded titania-based material comprising mesopores and macropores has a surface area of at least 5 m$^2$/g, preferably at least 30 m$^2$/g. The upper limit of the surface area is not critical, so long as the material is suitable for the intended use, such as a catalyst support. A particularly suitable range of surface area for a porous, extruded titania-based material comprising mesopores and macropores is 30 to 60 m$^2$/g, preferably 40 to 55 m$^2$/g. However, the surface area of the catalyst is not considered critical in relation to this invention, as zinc oxide supports may have considerably lower surface areas, and many aluminas or silicas may have much higher surface areas.

The porous, extruded titania-based material comprising mesopores and macropores may be prepared using any suitable form of titanium oxide, such as titanium dioxide (CAS No: 13463-67-7), titanium dioxide anatase (CAS No: 1317-70-0), titanium dioxide rutile (CAS No: 1317-80-2), titanium dioxide brookite (CAS No: 98084-96-9), and admixtures or composites thereof.

Where the porous, extruded titania-based material comprising mesopores and macropores is to be used as a catalyst support it is preferably substantially free of extraneous metals or elements which might adversely affect the catalytic activity of the system. Thus, preferred porous, extruded titania-based materials comprising mesopores and macropores are preferably at least 95% w/w pure, more preferably at least 99% w/w pure. Impurities preferably amount to less than 1% w/w, more preferably less than 0.6% w/w and most preferably less than 0.3% w/w. The titanium oxide from which the porous, extruded titania-based material is formed is preferably of suitable purity to achieve the above preferred purity in the finished extruded product.

The Fischer-Tropsch synthesis catalyst may additionally comprise one or more promoters, dispersion aids, binders or strengthening agents. Promoters are typically added to promote reduction of an oxide of metal to pure metal; for example cobalt to cobalt metal, preferably at lower temperatures. Preferably, the one or more promoters are selected from rhenium, ruthenium, platinum, palladium, molybdenum, tungsten, boron, zirconium, gallium, thorium, manganese, lanthanum, cerium or mixtures thereof. Where promoters are used, the promoter is typically used in a metal to promoter atomic ratio of up to 250:1, and more preferably up to 125:1, still more preferably up to 25:1, and most preferably 10:1.

In some or all embodiments, the Fischer-Tropsch synthesis catalyst may be prepared by incorporating a solution of at least one thermally decomposable cobalt, iron, nickel, ruthenium or rhodium compound into a process for the production of a porous, extruded titania-based material, i.e. by adding the solution of at least one thermally decomposable cobalt, iron, nickel, ruthenium or rhodium compound at any stage before extrusion of the homogenous catalyst. Alternatively, a Fischer-Tropsch synthesis catalyst may be prepared by impregnating a porous, titania-based material, preferably comprising mesopores and macropores, with a solution of at least one thermally decomposable cobalt, iron, nickel, ruthenium or rhodium compound.

Impregnation of a porous, titania-based material with the solution of at least one thermally decomposable cobalt, iron, nickel, ruthenium or rhodium compound may be achieved by any suitable method of which the skilled person is aware, for instance by vacuum impregnation, incipient wetness or immersion in excess liquid. The impregnating solution may suitably be either an aqueous solution or a non-aqueous, organic solution of the thermally decomposable metal compound. Suitable non-aqueous organic solvents include, for example, alcohols, ketones, liquid paraffinic hydrocarbons and ethers. Alternatively, aqueous organic solutions, for example an aqueous alcoholic solution, of the thermally decomposable metal-containing compound may be employed. Preferably, the solution of the thermally decomposable metal-containing compound is an aqueous solution.

Suitable metal-containing compounds are those which are thermally decomposable to an oxide of the metal following calcination, or which may be reduced directly to the metal form following drying and/or calcination, and which are completely soluble in the impregnating solution. Preferred metal-containing compounds are the nitrate, acetate or acetyl acetonate salts of cobalt, iron, nickel, ruthenium or rhodium, most preferably the nitrate, for example cobalt nitrate hexahydrate.

Another Fischer-Tropsch synthesis catalyst suitable for use in the present invention comprises particles of a cobalt and zinc co-precipitate. Preferably, such Fischer-Tropsch synthesis catalysts comprising particles of a cobalt and zinc co-precipitate also have a volume average particle size of less than 150 μm and a particle size distribution wherein at least 90% of the volume of the catalyst particles have a size between 0.4 and 2.5 times the average particle size. The volume average particle size and particle size distribution as used herein are as determined by a laser diffraction equipment, using a Malvern Master sizer MS 20 apparatus program contains 3 minutes, 25% (of maximum power) ultrasonic treatment before particle size distribution measurement; Calculation model: Model Independent; Presentation: 1907)

Fischer-Tropsch synthesis catalysts comprising particles of a cobalt and zinc co-precipitate can inter alia be made by the co-precipitation/admixing of containing Co- and Zn-precursors. The obtained co-precipitates/mixtures (solids) can be post-treated and finally reduced to yield a Co on zinc oxide catalyst. Suitable examples of co-precipitates include co-precipitates of Co/Zn oxide and Co/Zn carbonate, co-precipitates of Co/Zn hydroxide and Co/Zn hydroxycarbonate, and combinations thereof. Alternatively admixing of cobalt nitrates with zinc oxide precursors also produces a solid catalyst suitable for this invention.

Fischer-Tropsch synthesis catalysts comprising particles of a cobalt and zinc co-precipitate preferably essentially consists of cobalt and zinc oxide. It is however also possible that the catalyst contains one or more other components, such as components that are commonly employed in Fischer-Tropsch catalysts. For example such catalysts may contain one or more promoters, such as ruthenium, hafnium, platinum, zirconium, palladium, rhenium, cerium, lanthanum or a combination thereof. When present, such promoters are typically used in a cobalt to promoter atomic ratio of up to 10:1.

It has been found that a Fischer-Tropsch synthesis catalysts comprising particles of a cobalt and zinc co-precipitate also comprising at least one group IIIa element, preferably in a concentration of 0.1-10 wt % based upon the total weight of the catalyst, has a very favourable structural stability. Preferred group IIIa elements include aluminium (Al), gallium (Ga) and borium (B), of which aluminium is particularly preferred.

Suitable sources for ionic zinc respectively ionic cobalt useful in the preparation of Fischer-Tropsch synthesis catalysts comprising particles of a cobalt and zinc co-precipitate, include salts thereof that are soluble in the acidic solution and in water in a sufficient concentration. Preferred examples of such salts include zinc nitrate respectively cobalt nitrate and zinc acetate respectively cobalt acetate and other inorganic or organic salts of cobalt respectively zinc that have a similar solubility in the acidic solution.

In the preparation of Fischer-Tropsch synthesis catalysts comprising particles of a cobalt and zinc co-precipitate, suitable components for co-precipitating with the cobalt ions and zinc ions present are inorganic salts and organic salts that are soluble in an aqueous alkaline solution in a sufficient concentration, such as hydroxides, carbonates, urea, isocyanates and any other salt that can be used as base source and that can be dissolved water of in the alkaline solution. Preferred examples of such salts include ammonium carbonate, ammonium bicarbonate and other inorganic or organic salts of carbonate that have at least a similar solubility in the alkaline solution. Admixing of cobalt and zinc salts often use cobalt nitrate and zinc oxide to make the basic catalyst formulation.

In the preparation of Fischer-Tropsch synthesis catalysts comprising particles of a cobalt and zinc co-precipitate, the temperature during the co-precipitation process is preferably chosen in the range of 5° C. to 98° C., more preferably in the range of 115° C. to 75° C.

In some or all embodiments, the Fischer Tropsch synthesis catalyst is in the form of shaped particles, suitably, the Fischer Tropsch synthesis catalyst has a symmetrical geometry that includes, but is not limited to, cylinders, spheres, spheroids, pastilles, dilobes, such as cylindrical dilobes, trilobes, such as cylindrical trilobes, quadralobes, such as cylindrical quadralobes and hollow cylinders.

In some or all embodiments, the Fischer Tropsch synthesis catalyst is a porous titania-based material comprising mesopores and macropores which has a symmetrical geometry that includes, but is not limited to, cylinders, spheres, spheroids, pastilles, dilobes, such as cylindrical dilobes, trilobes, such as cylindrical trilobes, quadralobes, such as cylindrical quadralobes and hollow cylinders. In some or all embodiments, the Fischer Tropsch synthesis catalyst is a porous, extruded titania-based material comprising mesopores and macropores which has a symmetrical geometry that includes, but is not limited to, cylinders, dilobes, such as cylindrical dilobes, trilobes, such as cylindrical trilobes, quadralobes, such as cylindrical quadralobes and hollow cylinders.

While preferred embodiments have been shown and described, modifications thereof can be made by one skilled in the art without departing from the scope or teachings herein. The embodiments described herein are exemplary only and are not limiting. Many variations and modifications of the processes described herein are possible and are within the scope of the invention. Accordingly, the scope of protection is not limited to the embodiments described herein, but is only limited by the claims that follow, the scope of which shall include all equivalents of the subject matter of the claims.

Brief data is provided indicating the improvement above as detailed below.

For CoTiO2, an improvement in methane selectivity was seen after 700 hours on stream (at which point the high hydrogen feed appeared, i.e., $H_2$:CO ratio being 10:1) from 8.4% to 6.5%, remaining at 6.6% after a further 1900 hours on stream, indicating the long term benefit. A repeat later in the same run also showed the improvement from 7.4% back to 6.6%.

For CoZnO, an improvement in methane selectivity from 16.0% to 12.4% was seen.

It has been discovered that during the reactor run that CO could be removed for approximately 24 hours and continuing with hydrogen only at about 200° C. at 42 barg from the feed and then brought back on line and the performance of the catalyst was significantly better.

The catalysts were fully reduced prior to the startup and the process of the present invention is not merely a regeneration step as there is an improvement on catalyst performance beyond the initial first conditions data. The process of the present invention does not merely provide a short term benefit as the performance gains may extend for thousands of hours or the life of the run.

Table 1 shows the performance of the fixed bed catalyst at 42 barg, $H_2$:CO in a ratio of 1.8:1, 1250 $hr^{-1}$ GHSV with and without the described inventive treatment. All catalysts tested were fully reduced prior to syngas introduction and the time on stream (TOS) denotes the length of time under syngas conditions. Rows A and B show the effect of the treatment on FT performance before and after the treatment, while rows C and D show the effect on catalyst performance when the treatment in not carried out. In both cases the CO conversion was targeted to 62-65% and temperature was adjusted. Both tests were studied in the first 800 hours on stream to give a fair comparison. The treatment was completed as described herein, with CO removed and reintroduced slowly in stages until the desired gas composition is achieved. The catalyst used in this example was 10% Co/1% Mn on $TiO_2$. Improved performance has been demonstrated to remain for >3000 hrs on stream.

TABLE 1

Comparative test - with and without the treatment

| | | TOS/hrs | Conv | CH4_Set | T-Appl. |
|---|---|---|---|---|---|
| A | Before treatment | 225 | 64.9 | 8.4 | 198 |
| B | After treatment | 800 | 63.7 | 5.6 | 194 |
| C | Before treatment | 100 | 63.5 | 8.0 | 198 |
| D | After (without treatment) | 700 | 65.4 | 8.3 | 202 |

Table 2 shows the performance before and after the treatment at the same applied temperature. Performance data given is at 1250 $hr^{-1}$ GHSV, 30 barg, $H_2$:CO ratio of 1.8:1 using a 10% Co/1% Mn/$TiO_2$ catalyst.

TABLE 2

Effect at same temperature - showing higher conversion and better selectivity

| | Before | After | Difference |
|---|---|---|---|
| HOS | 253.16 | 302.44 | — |
| Applied Temperature | 206 | 206 | 0 |
| Conversion | 64.01 | 70.11 | 6.1 |
| CH4 Selectivity | 11.02 | 10.1 | -0.92 |
| C5+ Selectivity | 81.28 | 82.73 | 1.45 |
| C5+ Prod | 119.97 | 132.98 | 13.01 |

Table 3 shows the improved performance after the treatment measured at similar conversion, with lower applied temperature using a 10% Co 1% Mn $TiO_2$ catalyst at 1250 $hr^{-1}$ GHSV, 42 barg, $H_2$:CO ratio of 1.8:1.

TABLE 3

Effect at same conversion - showing lower applied temperature and better selectivity

| | Before | After | Difference |
|---|---|---|---|
| HOS | 527.6 | 705.35 | — |
| Applied Temperature | 206 | 202 | -4 |
| Conversion | 64.18 | 64.46 | 0.28 |
| CH4 Selectivity | 9.14 | 7.78 | -1.36 |

TABLE 3-continued

Effect at same conversion - showing lower applied temperature and better selectivity

| | Before | After | Difference |
|---|---|---|---|
| C5+ Selectivity | 83.31 | 85.17 | 1.86 |
| C5+ Prod | 126.96 | 126.68 | -0.28 |

Table 4 shows the use of cobalt and manganese precursors also demonstrate the effect, at 1250 $hr^{-1}$ GHSV, $H_2$:CO ratio of 1.8:1 and 42 barg on a 10% Co/1% Mn $TiO_2$ catalyst.

TABLE 4

Catalyst using cobalt acetate and manganese acetate as precursors.

| | Before | After | After @ same conv |
|---|---|---|---|
| HOS | 560 | 640 | 700 |
| Applied Temperature | 201 | 201 | 199 |
| Conversion | 60.8 | 66.8 | 61.4 |
| CH4 Selectivity | 7.4 | 6.5 | 5.6 |
| C5+ Selectivity | 86.5 | 87.5 | 88.4 |
| C5+ Prod | 113 | 128 | 120 |

Table 5 provides an example with Cobalt on titania using a 20% Co/TiO2 catalyst at 1500 $hr^{-1}$ GHSV, $H_2$:CO ratio of 1.8:1, 42 barg in a fixed bed reactor. CO feed gas was stepped out slowly to leave a hydrogen/nitrogen mixture at 42 barg. The catalyst was held under the flowing hydrogen/nitrogen atmosphere for approximately 24 hours, before the gas feed returned to FT reaction condition.

TABLE 5

$CoTiO_2$ catalyst (no Mn)

| | Before | After | After @ same conv |
|---|---|---|---|
| Temp | 202 | 197 | -5 |
| Conversion | 63 | 63 | — |
| $CH_4$Sel | 10.2 | 8.21 | -1.99 |
| $C_{5+}$Sel | 82.1 | 86.0 | +3.9 |
| $C_{5+}$Prod | 145 | 153 | +8 |

Table 6 shows the improved catalytic activity is also seen on other supports, in this example zinc oxide support was used, with 10% Cobalt. Conditions for operation were 1055 $hr^{-1}$ GHSV, $H_2$:CO ratio of 1.8:1 and 32 barg. The treatment involved cooling to 180° C. and a low pressure hydrogen purge of the reactor for 8 days before restarting under syngas.

TABLE 6

CoZnO Catalyst

| | Pre treatment | Post treatment | After @ same conv |
|---|---|---|---|
| Applied Temp C. | 210° C. | 195.5° C. | -14.5 |
| xCO | 54.6% | 54.3% | -0.3 |
| $sCH_4$ | 18.8% | 9.8% | -9.0 |
| $sC_{5+}$ | 72.7% | 83.3% | +10.6 |

Tables 7 and 8 show the effect of the treatment under more forcing conditions, with both cases using a 10% Co/1% Mn/$TiO_2$ catalyst at 1500 $hr^{-1}$ GHSV and 3600 $hr^{-1}$ GHSV respectively. In both cases the CO feed was dropped out gradually and held under $H_2/N_2$ for 24 hours before the reintroduction of CO, and return to pretreatment conditions, at lower applied temperature.

TABLE 7

Fixed bed catalyst test

|  | Before | After | After @ same conv |
|---|---|---|---|
| Temp | 215 | 203 | −12.0 |
| Conversion | 62.6 | 64.1 | +1.5 |
| $CH_4$ Sel | 9.3 | 5.5 | −3.8 |
| $C_{5+}$ Sel | 81.0 | 89.2 | +8.2 |
| $C_{5+}$ Prod | 144 | 159 | +15.0 |

TABLE 8

High productivity reactor catalyst test

|  | Before | After | After @ same conv |
|---|---|---|---|
| Temp | 219 | 211 | −8.0 |
| Conversion | 65.3 | 67.5 | +2.2 |
| $CH_4$ Sel | 8.2 | 5.5 | −2.7 |
| $C_{5+}$ Sel | 80.9 | 87.7 | +6.8 |
| $C_{5+}$ Prod | 362 | 404 | +42.0 |

Tables 9 and 10 both used a 10% Co 2% MnTiO2 catalyst at 1250 hr$^{-1}$ GHSV, $H_2$:CO ratio of 1.8:1. Table 9 shows performance is improved by means of a lower applied temperature, better selectivity or productivity. Table 10 shows the benefit at the same applied temperature. In both cases the CO feed was removed stepwise to leave a $H_2/N_2$ flowing feed over the catalyst for 24 hours before CO was reintroduced and returned to FT condition prior to the treatment.

TABLE 9

Increased manganese catalyst test

|  | Prior to treatment | Post treatment | After @ same conv |
|---|---|---|---|
| Applied Temperature | 206 | 200.5 | −5.5 |
| Conv. | 62.96 | 65.89 | 2.93 |
| CH4 Sel. | 9.64 | 7.97 | −1.67 |
| C5+ Sel | 81.41 | 84.62 | 3.21 |
| C5+ Prod | 118.55 | 128.29 | 9.74 |

TABLE 10

Increased manganese catalyst test

|  | Prior to treatment | Post to treatment | After @ same Temp |
|---|---|---|---|
| Applied Temperature | 206 | 206 | 0 |
| Conv. | 63.78 | 72.53 | 8.75 |
| CH4 Sel. | 9.25 | 7.69 | −1.56 |
| C5+ Sel | 81.15 | 84.87 | 3.72 |
| C5+ Prod | 119.49 | 141.16 | 21.67 |

The performance of the cobalt/manganese catalysts showed an increase in performance, i.e., higher conversion at same temperature and lower methane selectivity.

The invention claimed is:

1. A process for improving performance of a Fischer-Tropsch catalyst comprising the steps of:
    (a) contacting the catalyst with hydrogen or syngas at a temperature in the range of from about 200° C. to about 450° C., under a pressure in the range of from about 0 barg to about 50 barg, and a GHSV in the range of from about 500 hr$^{-1}$ to about 5000 hr$^{-1}$, for a period of time of at least 1 hour to provide a reduced catalyst;
    (b) contacting the reduced catalyst of step (a) with syngas comprising $H_2$:CO in a ratio in the range of from about 1:1 to about 2.1:1, in a Fischer-Tropsch synthesis reactor under a pressure in the range of from about 0 barg to about 50 barg and a GHSV of over 1000 hr$^{-1}$, at a temperature in the range of from about 100° C. to about 280° C.;
    (c) subjecting the catalyst of step (b) to a high hydrogen level treatment by increasing the ratio of $H_2$:CO of the syngas to a ratio of at least 3:1 at a pressure in the range of from about 30 barg to about 42 barg, for a period of time of at least 1 hour at a temperature in the range of from about 160° C. to about 250° C., and a GHSV in the range of from about 1000 hr$^{-1}$ to about 8000 hr$^{-1}$; and
    (d) decreasing the ratio of $H_2$:CO of the syngas to a ratio in the range of from about 1:1 to about 2.1:1, at a GHSV of from about 1250 hr$^{-1}$, under a pressure in the range of from about 30 barg to about 42 barg, and at a temperature in the range of from about 160° C. to about 280° C.

2. A process for improving performance of a Fischer-Tropsch catalyst comprising the steps of:
    (a) contacting the catalyst with hydrogen or syngas at a temperature in the range of from about 200° C. to about 450° C., under a pressure in the range of from about 0 barg to about 50 barg, and a GHSV in the range of from about 500 hr$^{-1}$ to about 5000 hr$^{-1}$, for a period of time of at least 1 hour to provide a reduced catalyst;
    (b) contacting the reduced catalyst of step (a) with syngas comprising $H_2$:CO in a ratio in the range of from about 1:1 to about 2.1:1, in a Fischer-Tropsch synthesis reactor under a pressure in the range of from about 0 barg to about 50 barg and a GHSV of over 1000 hr$^{-1}$, at a temperature in the range of from about 100° C. to about 280° C.;
    (c) subjecting the catalyst of step (b) to a high hydrogen level treatment by replacing the syngas with either pure hydrogen or a hydrogen/nitrogen mixture, at a pressure in the range of from about 30 barg to about 42 barg for a period of time of at least 1 hour at a temperature in the range of from about 160° C. to about 250° C. and a GHSV in the range of from about 1000 hr$^{-1}$ to about 8000 hr$^{-1}$; and
    (d) decreasing the hydrogen level and restoring a ratio of $H_2$:CO of the syngas to a ratio in the range of from about 1:1 to about 2.1:1, at a GHSV of from about 1250 hr$^{-1}$, under a pressure in the range of from about 30 barg to about 42 barg, and at a temperature in the range of from about 160° C. to about 280° C.

3. A process for improving performance of a Fischer-Tropsch catalyst comprising the steps of:
    (a) contacting the catalyst with hydrogen or syngas at a temperature in the range of from about 200° C. to about 450° C., under a pressure in the range of from about 0 barg to about 50 barg, and a GHSV in the range of from about 500 hr$^{-1}$ to about 5000 hr$^{-1}$, for a period of time of at least 1 hour to provide a reduced catalyst;
    (b) contacting the reduced catalyst of step (a) with syngas comprising $H_2$:CO in a ratio of from about 1:1 to about 2:1, under a pressure in the range of from about 0 barg to about 50 barg and a GHSV of over 1000 hr$^{-1}$, at a temperature in the range of from about 100° C. to about 280° C.;

(c) eliminating the CO from the syngas of step (b) for a period of time of at least 1 hour; and (d) reintroducing the CO to provide syngas with a ratio of $H_2$:CO in the range of from about 1:1 to about 2.1:1, at a GHSV of about 1250 hr$^{-1}$, under a pressure in the range of from about 30 barg to about 42 barg, and at a temperature in the range of from about 160° C. to about 280° C.

4. The process of claim 1, wherein the Fischer-Tropsch reactor is a fixed bed or tubular reactor.

5. The process of claim 1, wherein the Fischer-Tropsch reactor is a slurry reactor.

6. The process of claim 1, wherein following step (a) the catalyst is passivated prior to step (b).

7. The process of claim 1, wherein step (a) occurs within the Fischer-Tropsch synthesis reactor.

8. The process of claim 1, wherein step (a) occurs in a reactor other than the Fischer-Tropsch synthesis reactor.

9. The process of claim 1, wherein the temperature if step (b) is in the range of about 160° C. to about 240° C.

10. The process of claim 1, wherein the temperature if step (b) is in the range of about 160° C. to about 230° C.

11. The process of claim 1, wherein the catalyst is CoZnO.

12. The process of claim 1, wherein the catalyst is $CoTiO_2$.

13. The process of claim 1, wherein the catalyst is $CoMnTiO_2$.

14. The process of claim 2, wherein the Fischer-Tropsch reactor is a fixed bed or tubular reactor.

15. The process of claim 2, wherein the Fischer-Tropsch reactor is a slurry reactor.

16. The process of claim 2, wherein the catalyst is CoZnO, $CoTiO_2$, or $CoMnTiO_2$.

17. The process of claim 3, wherein the Fischer-Tropsch reactor is a fixed bed or tubular reactor.

18. The process of claim 3, wherein the Fischer-Tropsch reactor is a slurry reactor.

19. The process of claim 3, wherein the catalyst is CoZnO, $CoTiO_2$, or $CoMnTiO_2$.

20. The process of claim 1, wherein the catalyst is contacted with hydrogen or syngas in step (a) and/or step (c) for a period of time in the range of from 1 hour to 24 hours.

21. The process of claim 1, wherein the reduced catalyst is contacted with hydrogen or syngas in step (b) under a pressure in the range of from 10 barg to 42 barg.

* * * * *